Figure 1:
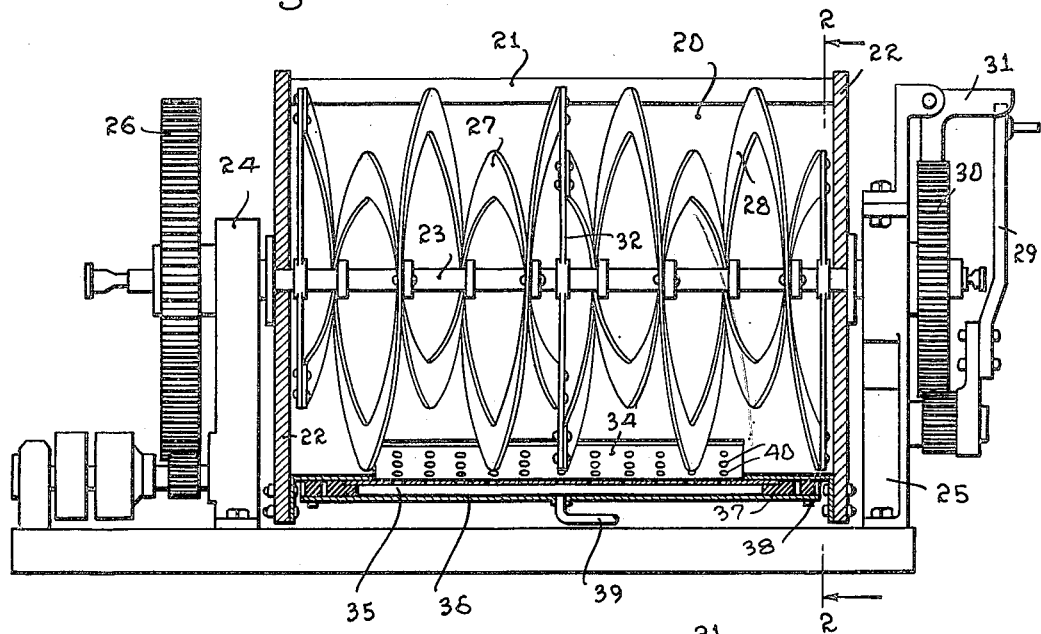

July 1, 1930.   J. A. RICE ET AL   1,769,309
APPARATUS FOR PRODUCING CELLULAR CEMENTITIOUS MATERIAL
Filed June 22, 1928   6 Sheets-Sheet 1

July 1, 1930.  J. A. RICE ET AL  1,769,309

APPARATUS FOR PRODUCING CELLULAR CEMENTITIOUS MATERIAL

Filed June 22, 1928  6 Sheets-Sheet 2

INVENTORS
John A. Rice
Richard B. Rice
BY
ATTORNEY.

July 1, 1930.   J. A. RICE ET AL   1,769,309

APPARATUS FOR PRODUCING CELLULAR CEMENTITIOUS MATERIAL

Filed June 22, 1928    6 Sheets-Sheet 4

INVENTORS
BY
ATTORNEY.

Patented July 1, 1930

1,769,309

UNITED STATES PATENT OFFICE

JOHN A. RICE AND RICHARD B. RICE, OF BERKELEY, CALIFORNIA

APPARATUS FOR PRODUCING CELLULAR CEMENTITIOUS MATERIAL

Application filed June 22, 1928. Serial No. 287,475.

The present invention relates to a process of mixing and making mortars and cementitious materials, but more particularly to a process and apparatus for manufacturing so-called "cellular concretes", such concretes combining great strength with lightness.

This lightness of the building material, known by the trade name as "cellular concrete", is obtained by introducing air or other gas into the cement slurry while in a pliable state during manufacture.

There are several methods or processes known and practiced whereby air or other gas is introduced into a cement slurry, imparting thereto a cellular structure which persists after the cement has set and hardened. Among the various methods are the following, which are well known to the art; two may here be mentioned.

One method consists in introducing a metallic powder into the cement slurry, whereby the action of the calcium hydrate of the cement sets free hydrogen gas, forming bubbles or cells in the mix. The mixture is allowed to stand quietly until set, and then it is cured in the same way as other cement products are cured.

Another method consists in making a cement slurry and a tenacious foam in separate containers, and then mixing the two, whereby the air cells of the foam retain their structure, imparting the structure to the resulting mix, which retains said structure while setting and curing.

We have invented three additional and new methods of incorporating cells of air into cement slurry, together with several different kinds of cell solution and several different machines which may be used in carrying out our processes.

The factors or conditions essential to the success of all processes in the making of cellular concrete are the following:

(1) A liquid must be present in the cement slurry which will impart to the slurry the following qualities: (a) Condition of surface tension such that when air cells are formed in the slurry they will remain separate from one another and not coalesce or break into one another, thus defeating the object in view of forming a permanent cellular structure; (b) the envelope of the gas cells formed by introducing air or other gas into the slurry must remain sufficiently strong, tenuous and permanent while the cement is setting, so that the cellular structure will not be broken down by the influence or results of the chemical action in the crystallizing cement. Having this quality, the cells will remain unbroken for more than six hours (in the case of using Portland cement), until the cement has hardened sufficiently to support the cellular structure, the wall of the cell envelope finally being absorbed by the setting cement; (c) the liquid constituting the envelope of the gas cells in the cellular product must be of such a nature as not to chemically act upon the cement, and thus impair its ultimate strength or hardness after the curing interval.

(2) The method of introducing gas cells into the cement slurry must be such that cells of suitable size are formed in large numbers and mixed homogeneously with the slurry without use of excessive amount of "cell solution".

Figure 2:
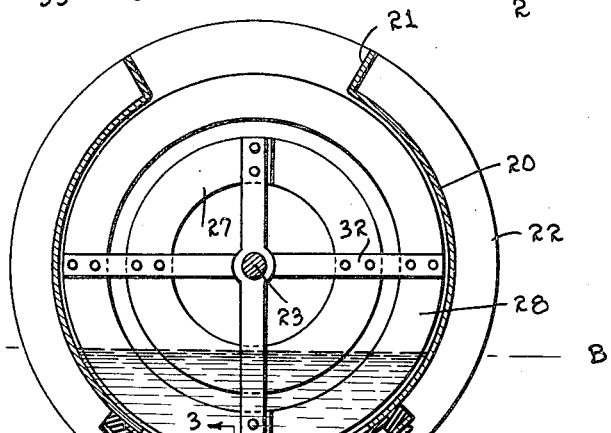
Figure 3:
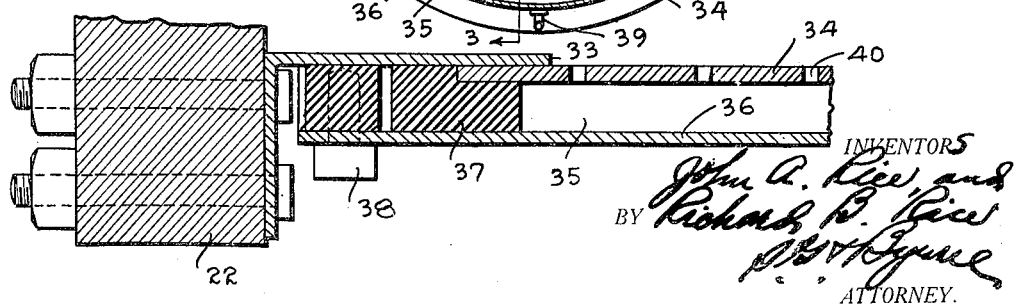
Figure 4:
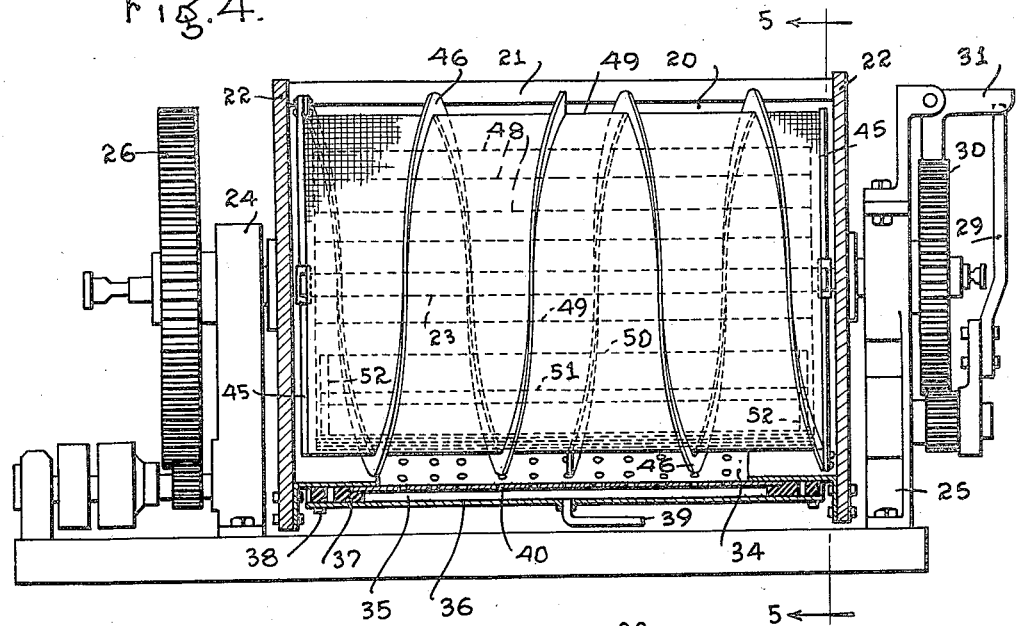
Figure 5:
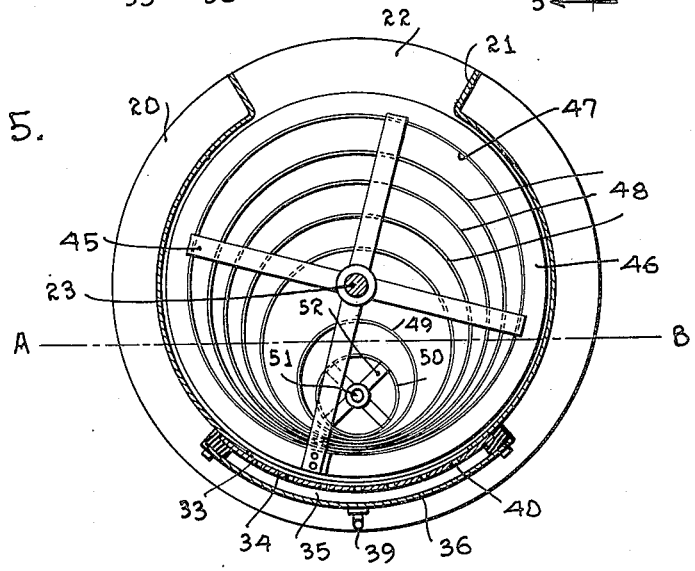
Figure 6:
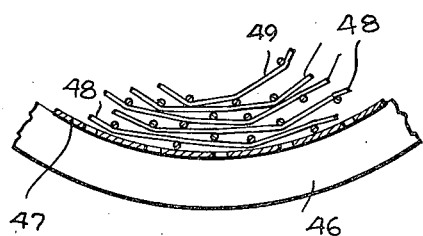
Figure 7:
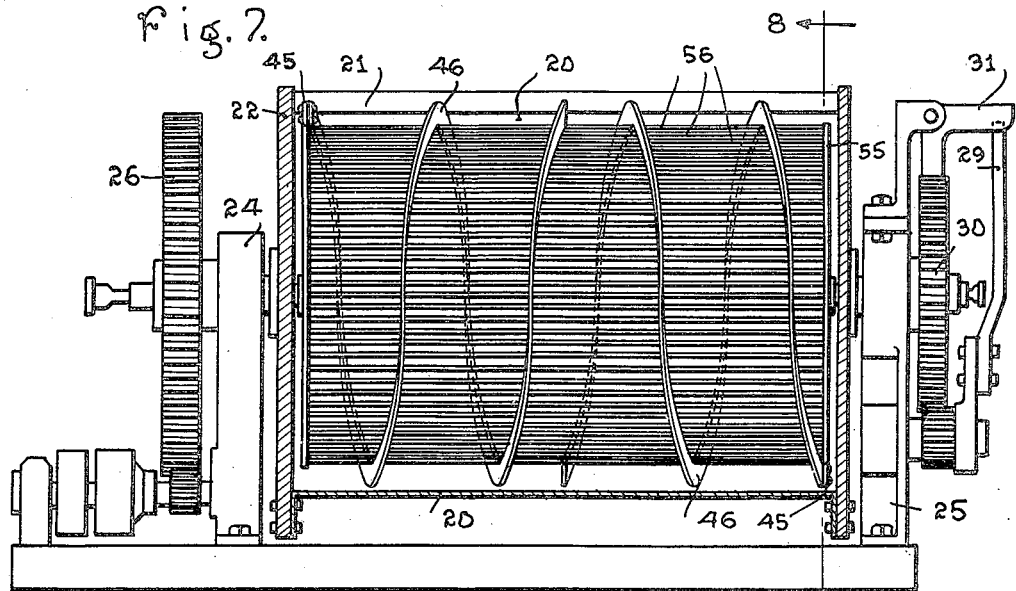
Figure 8:
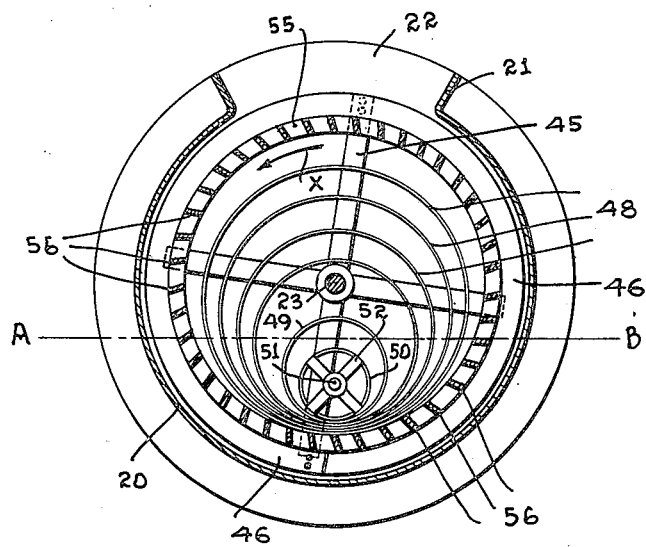
Figure 9:
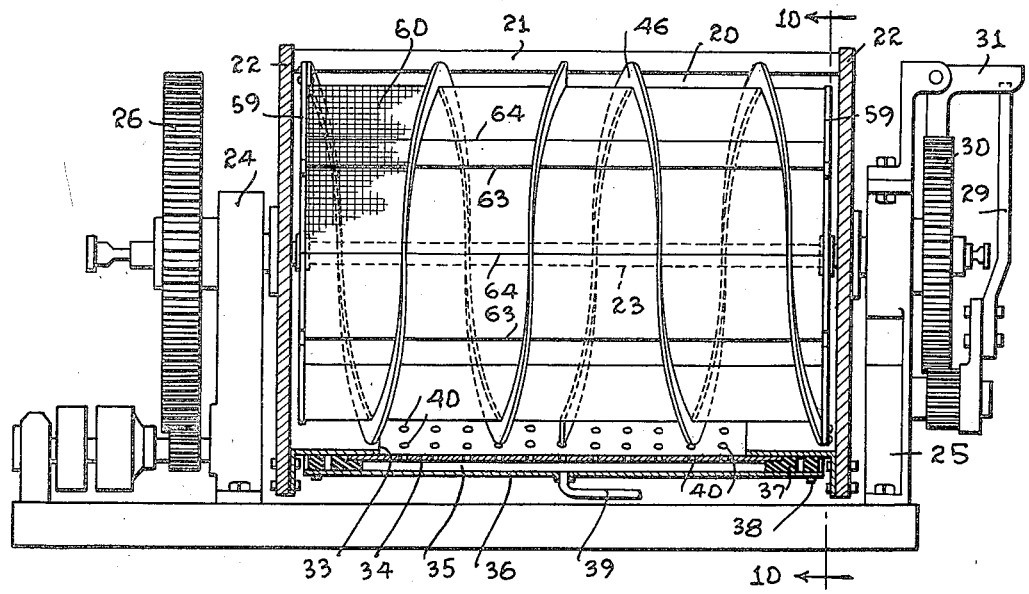
Figure 10:
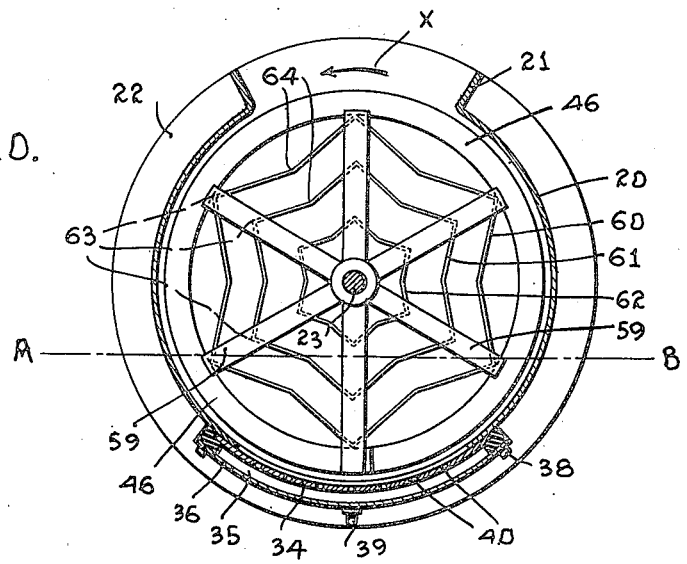
Figure 11:
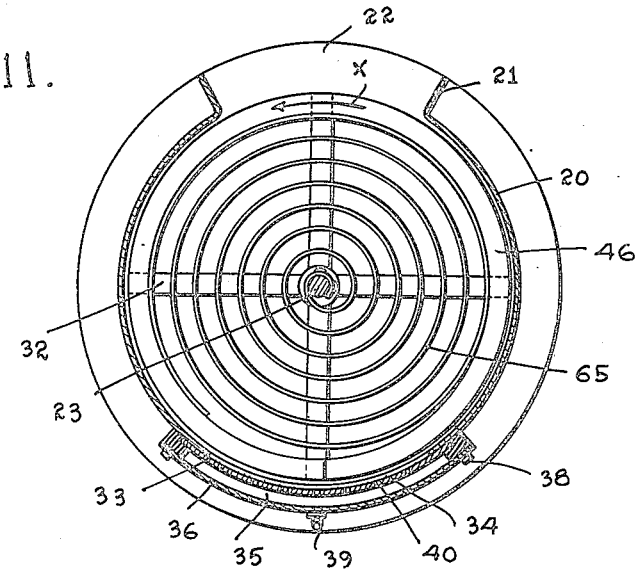
Figure 12:
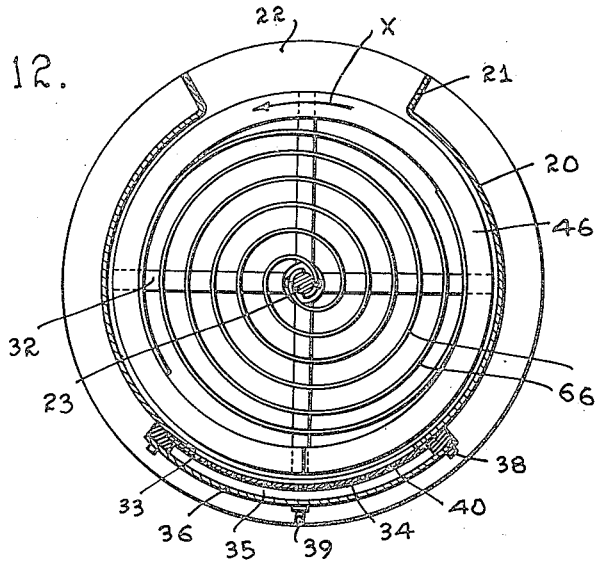
Figure 13:
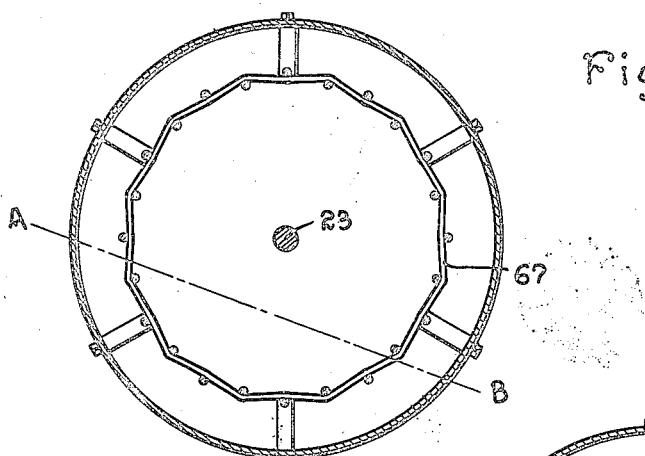
Figure 14:
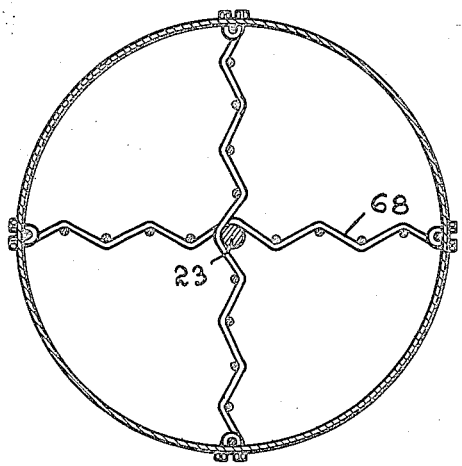
Figure 15:
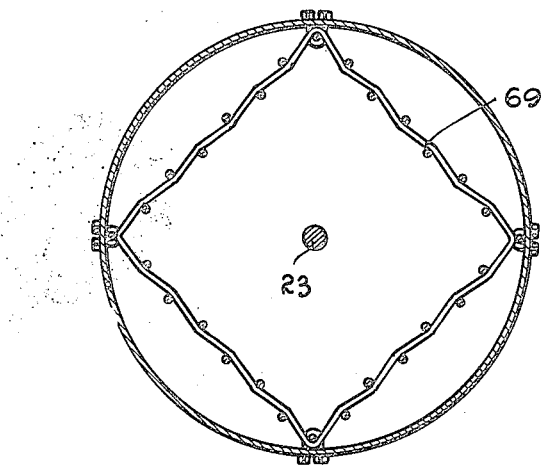

In the accompanying drawings suitable apparatus for carrying out the present invention have been indicated, and Figure 1 shows a front elevation and partial section of the simplest form of construction of the apparatus;

Figure 2 a transverse section along line 2—2 of Figure 1;

Figure 3 a fragmentary section in larger scale taken along line A—B of Figure 2;

Figure 4 is a front elevation and partial section of a modified form of the apparatus;

Figure 5 a transverse section along line 5—5 of Figure 4;

Figure 6 a fragmentary end view in larger scale of Figure 5;

Figure 7 is a front elevation and partial section of another modified construction;

Figure 8 a transverse section along line 8—8 of Figure 7;

Figure 9 a front elevation and partial section of still another modification of the apparatus, showing star-shaped cages within the container;

Figure 10 is a transverse section along line 10—10 of Figure 9;

Figures 11 and 12 are transverse sections of the apparatus, showing spirally constructed nests and cages within the container; and Figures 13, 14 and 15 are cross-sectional views similar to Figures 11 and 12, showing other forms of cages which are suitable for use in mixing materials containing large sized aggregate, such as common concrete.

In the different views of the drawings like reference characters relate to the same parts.

Referring first to the form of the apparatus illustrated in Figures 1, 2 and 3, numeral 20 denotes a container for the cement slurry. This container which is preferably cylindrical and constructed out of heavy sheet metal, has a flared mouth or hopper-like opening 21 at the top and closed ends 22. It is mounted loosely on a shaft 23, which is carried in end bearings 24, 25 to revolve therein actuated by a suitable drive, such as gears 26, from any source of power.

On the shaft 23 are secured, through the intermediary of spiders 32, helically wound inner and outer blades 27 and 28 of which one side is preferably wound right hand and the other left hand in order to create counter currents running in axial direction of the container when the blades are rotated.

In order to discharge the container, a crank 29 and gears 30 connected with one of the end walls 22 of the container are provided. When the crank is turned the container is tilted around its axis independent of the shaft 23 and the blades 27, 28. Ordinarily, however, while the apparatus is in operation the container is held stationary by locking the gears 30 and crank 29 by means of a dog 31.

The bottom portion of the container or drum 20 is shown with an opening 33 covered with a sieve or perforated plate 34 preferably of sheet metal. The perforations 40 are suitably one-thirty-second ($\frac{1}{32}$) of an inch in diameter or less and spaced apart approximately one inch or more. Beneath this plate is provided a chamber 35 for compressed air or other gas. The outer wall of this chamber is formed by a plate 36 spaced from the sieve 34 by rubber gaskets 37 and removably secured by bolts 38. Midway between its ends an inlet pipe 39 is provided in the plate 36 and connected in any suitable manner, as by a hose with a source of compressed air or gas.

A suitable size of this apparatus would be twenty-four inches diameter and forty inches length of the container. This apparatus would be used for blowing air bubbles into the cement slurry, thereby forming cellular concrete.

On sheet 2 of the drawings containing Figures 4, 5 and 6 the main structure of the apparatus is like the one already described with the cylindrical container or drum 20 having a perforated bottom 34 adjacent a compressed air or gas chamber 35 and a conduit 39 leading from a compressed air source as before.

On spiders 45, secured on the revoluble shaft 23, are fastened helical bands 46 wound right and left hand as before, but in this case only outer bands are used. These bands are so arranged with their outer edges close to the inner surface of the drum or container 20 that they will scrape the same in order to remove thickened slurry and at the same time thoroughly mix the contents of the same.

The main differences between the apparatus previously described and the one shown in Figures 4, 5 and 6 resides in the provision of a set of cylindrical cages 47, 48 and 49, which are all open ended and of graded diameters so that a smaller one can be inserted in the next larger and is free to roll therein. These cages are all made of wire screen or perforated sheet metal so as to permit the cement slurry to pass in and through their walls, and a suitable wire mesh would have four apertures to the square inch and wire of number ten gage. The cage 47 has the same diameter as the interior diameter of the bands 46 and the other cages all contact at the bottom of each succeeding cage 48 and 49. In this manner the entire weight of all the cages is supported at the lowest point of the blades. In order to further increase the pressure at this point, a still smaller cylindrical cage 50 is mounted to freely roll within the small cage 49 and is, therefore, provided with a heavy central bar or shaft 51 fastened therein by spiders 52.

The same material is used in this smallest cage 50 as in the other cages. When this apparatus is in operation all the cages will roll one within the other while air is forced upwards through them from the compressed air chamber 35 beneath.

The apparatus just described would be used for blowing air bubbles into the slurry to form air cells similarly as described in connection with Figures 1, 2 and 3, with the difference that additional mechanical means in the form of cylindrical, freely rotating cages are here utilized for obtaining a better commingling and diminution of particles.

A combination of the two constructions shown on Sheets 1 and 2 of the drawings is illustrated on Sheet 3 containing Figures 7 and 8, which show the container 20 freely mounted on a shaft 23 on which the helical blades 46 are secured by means of the spiders 45. Wire cages 47, 48, 49 and 50 are as before mounted to revolve freely within the helical blades 46, but with the difference that a bucket wheel 55 in interposed between the outermost or largest cage 47 and the inner edge of the helical blades 46. This bucket wheel is secured to the shaft 23 through the intermediary of the spiders 45, together with the helical blades 46. The buckets 56 preferably consist of flat, narrow, metallic plates which are inclined to the radial lines of the wheel or the cylindrical drum 20 in such a manner that the exterior edges of the buckets are slightly in advance of their interior edges when the wheel rotates in the direction of arrow X in Figure 8. The buckets thus serve to scoop up and carry air beneath the surface of the slurry to form air bubbles. For this reason the air chamber and perforated bottom of the drum or container may, in this case, be dispensed with, as the buckets serve the same purpose.

In Figures 9 and 10 is shown still another modification of our cellular concrete mixer. The same drum or container 20 mounted on shaft 23 in a suitable stand is used as before, but the drum may or may not be provided with a perforated bottom and adjacent compressed air chamber. The same kind of oppositely wound helical bands 46 are here used and mounted by means of spiders 59 on the shaft 23 so as to revolve independent of the drum 20.

Instead of the freely revolving cages described in connection with Figures 4 to 8, star-shaped cages 60, 61 and 62 of different cross-sections are here shown one within the other and all secured to the same spiders 59 which secure the helical blades 46 on the shaft 23. It will thus be seen that the cages and the helical blades revolve together during operation and at the same speed. The material used for these cages may be wire screen, perforated metal, expanded sheet metal or other similar material; the perforating or grading should be approximately the same as previously described; that is to say, about four perforations to the square inch. In the drawing the cages are shown as six-pointed stars in cross-section, but they may, of course, have any other number of points. The wires or plates are not stretched straight between the star points 63, but dented inwardly, as at 64, midway between them.

Instead of the star-shaped cross section of the cages indicated in Figure 10, they may have any other cross-section found suitable; as, for instance, a single spiral 65, as shown in Figure 11, or a double spiral 66, as shown in Figure 12. Or a circular cage 67, as seen in Figure 13, may be used and secured in any suitable manner to the shaft 23 to rotate with the helical bands. The cage 68 in Figure 14 is in the form of a cross and in Figure 15 of square-shaped cross-section 69, but it is evident that a triangular or other polygonal cross-section may be selected as most suitable for any particular purpose.

As already stated, the apparatus constructed as shown in Figures 9 and 10, operates preferably without an air blast. In this case aqueous films are formed in the perforations on the exposed walls of the cages 60, 61 and 62 when they emerge from the slurry, and these films are slid off said walls and carried into the slurry during the submersion of the cage walls.

To summarize: The following different methods may be followed to form cellular concrete from cement slurry:

1. The apparatus shown in Figure 1 is preferably used in connection with a process for blowing air bubbles into a cement slurry; the apparatus shown in Figure 4 may also be used for this purpose.

2. The apparatus shown in Figure 4 is used in connection with a process combining air blast with mechanical agitation for introducing air bubbles into a cement slurry.

3. The apparatus shown in Figure 7 is used in connection with a process utilizing mechanical agitation only (without a blast) for introducing air bubbles into a cement slurry.

4. The apparatus shown in Figure 9 is used in connection with a process for mechanically introducing aqueous films into cement slurry.

Referring now to process 1, using an air blast and the apparatus shown in Figures 1, 2 and 3, the operation is as follows: A cement slurry, consisting of a mixture of cement, water, sand, or other aggregate, is poured into the container 20, through its mouth 21, filling the same to about one-fourth of its capacity or to line A—B in Figure 2. To the slurry is added a desirable quantity of so-called "cell solution", the composition of which will be given further on. The apparatus is thereupon set in motion; that is to say, the shaft 23 with the helical blades 27, 28 are rotated at a peripheral speed of about 135 feet per minute; the container 20, however, remaining upright. The air blast is next started, forcing air (or gas) into the chamber 35 and thence through the small apertures 40 in the sieve or perforated bottom 34 into the slurry in the form of fine jets of air. The action of the revolving helical blades will now not only cause counter currents in axial direction in the slurry, mixing the same homogeneously, but they will also serve to break up the jets of air so that a multitude of minute air bubbles are formed in the slurry. As the action of the apparatus continues, the volume of the slurry will gradually increase, and when the desired volume has been obtained the helical blades are stopped and the contents, now finished cellular concrete, is poured, by tilting the container, using the crank 29, into suitable molds and allowed to set and harden.

Process 2, combining air blast with mechanical agitation for introducing air into the slurry and the apparatus shown in Figures 4, 5 and 6 operate as follows: The slurry and "cell solution" are as before poured into the container 20 to about the height of line A—B, Figure 5, and the helical blades 46 revolved, while fine air jets are forced into the slurry from the air chamber 35 through the screen 34, as already described. As the helical blades 46 revolve, they will cause the wire cage 47 to revolve with them, while the inner cages 48, 49 and 50 will roll within each other. This will cause the air jets and coarse bubbles to break up into smaller ones and mix them homogeneously through the slurry. In addition, fine films of slurry and "cell solution" will form in the cage apertures when the cage walls pass out of the mix on one side and be deposited in the slurry as said walls again enter the slurry on the other side of the container. The presence of the "cell solution" insures the stability of the bubbles during the mixing and subsequently while the cement is setting. When the slurry has, in this manner, been sufficiently expanded to obtain the desired consistency of the cellular concrete, it is poured from the container into suitable molds to harden.

Process 3, introducing air into the slurry by mechanical agitation and the apparatus shown in Figures 7 and 8 operate in the following manner: The usual slurry and a "cell solution" are deposited in the container 20 to about one-fourth of its contents to the level of A—B and the helical blades 46 started to revolve with the shaft 23. This will cause the bucket wheel 55 to revolve with it and the cages 48, 49 and 50 to roll inside thereof. Instead of a blast for introducing air as used before, the buckets 56 of the wheel 55 revolving in the direction of arrow X will now scoop up atmospheric air and drive it centerward and down into the slurry. A suitable peripheral speed of the helical blades 46 is approximately 100 feet per minute for average sized bubbles; if less, coarser bubbles will be produced in the slurry, and if the speed is greater, finer bubbles will be the result. Some of the air bubbles will escape upwards in the cages 48, 49 and 50, but be caught between these walls and reduced to finer bubbles as the cages roll within each other. The "cell solution" serves to provide each cell with a proper envelope of aqueous film of the kind desired. As soon as the volume of the slurry has increased sufficiently, or to the height of the shaft 23, the machine is stopped and the resultant cellular concrete poured into molds and permitted to harden.

It should here be noted that the units in this apparatus have different functions; thus the helical blades 46 set up counter currents in the slurry, carrying it in substantially axial direction and causing a thorough commingling of the particles. The bucket wheel, on the other hand, forces air into the slurry and sets up substantially centripetal currents in the slurry, while the cages divide the air cells into smaller and smaller ones and also aid in making the mix homogeneous.

Process 4, introducing aqueous films into cement slurry and the apparatus therefor seen in Figures 9 and 10. The operation is as follows: Cement slurry and "cell solution" are filled into the container 20 as before up to line A—B approximately and the helical blades 46 started to revolve, together with the star-shaped cages 60, 61 and 62. The peripheral speed of the helical blades is preferably 60 to 75 feet per minute, in order to produce large sized cells. The action of this apparatus is based on the following well known principle. When a clean wire screen or a perforated metal sheet is dipped into a cement slurry containing an adequate quantity of "cell solution," and then gently removed therefrom, then thin, aqueous films will adhere to the screen or perforated plate and stop up the apertures therein. If thereupon the screen or sheet with the adhering films are pushed in slantingly into the slurry, these films will be dragged off or pushed away from the screen into the slurry and will then form air cells in the slurry.

For this reason the apparatus shown in Figures 9 and 10 operating on this principle must be run at slow speed. If the blades 46 and the cages 60, 61 and 62 are revolved in the direction of arrow X or counter clockwise, the screen walls will be raised out of the slurry at the right side at B and again submerged at the left side, or at A, as seen in Figure 10, thus carrying the aqueous films from the right side and again depositing them at the left side of the container. To facilitate this the cage walls are broken and made to enter the slurry slantingly and not flatly. The helical blades 46 assist in mixing the cells and slurry and, in addition, serve to scrape adhering cement from the surface of the container 20 and the cage walls also operate to cut and divide large bubbles collected on the surface into smaller ones. If this machine is operated at a higher speed, viz, approximately 135 feet per minute, (peripheral speed), the action of the star-shaped cages will be to force air into the slurry by "beating action," instead of utilizing the films which adhere to the meshes of the screen at slow speeds. This will result in the formation of very much smaller bubbles, but the ultimate result will be a cellular concrete nevertheless. A wire mesh made of number ten gage wire with two to four meshes to the square inch has been found most suitable for the cages, in that it apparently carries larger cells beneath the surface, which cells become coated with the films. The operation of the apparatus is as before continued until the slurry has increased the desired amount, whereupon it is poured into molds and allowed to harden.

As stated before, cages such as are illustrated in Figures 11, 12, 13, 14 and 15 may be used to advantage instead of the cages 60, 61 and 62 in the apparatus shown in Figures 9 and 10. Cages of type 13, 14 and 15, with large sized meshes (three inches to four inches square more or less, that is to say, nine square inches to sixteen square inches to the mesh, more or less as desired), and mounted within a revolvable drum as shown, (such as the ordinary drum type concrete mixer), are particularly adapted for use in mixing concrete containing large sized aggregate, such as coarse gravel or crushed rock. When so used, a very heavy screen would be advisable, made of iron rods ⅜ to ¾ inch in diameter. With such a machine very dry concrete could be efficiently and homogeneously mixed, making a concrete of maximum compressive strength by the use of a minimum amount of tempering water. Such a machine would be characterized as a "dry mixer."

In carrying out the present invention we prefer to use a "cell solution" made in accordance with the following formulæ:

"*Cell solution A*"

| | Parts by weight |
|---|---|
| Casein (powdered) | 100 |
| Water | 450 |
| Lime (calcium hydrate) | 60 |

Mix the casein and water, and, after the casein has swelled to a maximum volume, add the lime (dry or else wetted with a portion of the water), stirring until the casein is entirely in solution, and then transfer to a suitable vessel and allow to stand quietly until hydrolized. In a short time the mixture will stiffen to a jelly-like mass. If kept at a temperature of around seventy degrees Fahrenheit, hydrolysis will be completed in from ten days to two weeks, the jelly-like structure breaking down and the mass assuming the consistency of a liquid. Some of the lime and some of the constituents of the casein will settle to the bottom of the vessel as a precipitate. After hydrolysis the liquid will be of a foamy consistency, in that it may be easily beaten to a stiff foam. It will impart this characteristic to a large amount of water if a small amount of the liquid be diluted in water.

The casein mixture is now suitable for use as a "cell solution", but we prefer to add the following additional ingredients, in order to impart to the mixture certain desirable characteristics of toughness or tenuousness of the films to be formed around the gas cells designed to be formed in cement slurry, so that the gas cells will satisfactorily retain their structure during the process of mixing with the slurry and during the chemical changes in the slurry while the cement is setting. To the mixture above described which has hydrolyzed we add:

| | Parts by weight |
|---|---|
| Lime (dry calcium hydrate) | 20 |
| Alum crystals | 20 |
| Water | 20 |
| Glue (a ten per cent solution) | 25 |
| Arsenious acid | 10 |
| Calcium chloride crystals | 20 |
| Potassium hydrate crystals | 2 |

First add the lime (dry powdered) to the "cell solution". The alum should be mixed with the water and heated until in complete solution, after which, having thoroughly stirred in the lime into the hydrolized casein, and added the glue solution and thoroughly stirred the same, the alum solution is added gradually while stirring. The arsenic is mixed with a small amount of additional water to form a smooth paste and the paste is added to the casein mixture and thoroughly stirred. Upon the addition of the alum solution to the casein mixture calcium sulphate and aluminum hydrate are formed as precipitate. An excess of calcium hydrate is provided for the purpose of dissolving and holding in solution the aluminum hydrate. Thus the aluminum hydrate, being in solution or partial solution, remains a homogeneous part of the compound, and finally becomes a constituent of the film envelope of every gas cell in the completed cellular concrete mix, while the calcium sulphate is precipitated and may be finally removed from the compound by decantation or filtration. When the compound is incorporated, diluted, in the cement slurry, and later during the chemical action accompanying the setting of the cement, after the same has been formed around the gas cells, the calcium hydrate is partially taken from the cell films, precepitating the aluminum hydrate as a tough jelly-like film which resists the tendency to disintegrate caused by the mechanical movement of mixing and the rise of temperature subsequently brought about by the chemical action of the setting cement.

The curds of precipitated aluminum hydrate mixed with pasty calcium sulphate which form in the casein mix upon the addition of the alum solution will be disintegrated upon vigorous and continued stirring. This condition should be brought about before additional ingredients are added. It will be best to permit the compound to stand several hours, frequently agitating vigorously until the aluminum hydrate has been dissolved by the excess of calcium hydrate.

After the aluminum hydrate curds have all been disintegrated, and the frequent stirring of the compound has resulted in a smooth homogeneous mixture, add the calcium chloride crystals (preferably powdered or in a comminuted state), stirring constantly until the calcium chloride is in complete solution. Finally add the potassium hydrate, which has previously been dissolved in a small amount of water. Add slowly while stirring constantly.

We prefer to use the ammonium alum. But other alums may be used instead. If potash alum is used, then it will not be necessary to add any potassium hydrate, as the decomposition of the potash alum will furnish that ingredient. It is best to use at least a small portion of ammonium alum, even though potash alum is used, or even if plain aluminum sulphate is used, as the presence of ammonia is desirable.

The completed "cell solution" is now allowed to stand for several days to permit the solid precipitates to settle to the bottom of the container, whereupon the "cell solution" is drawn off and is ready for use.

"Cell solution B"

|  | Parts by weight |
|---|---|
| Casein | 100 |
| Water | 500 |
| Ammonia | 15 |

Mix the casein and water and allow to stand until the casein is swelled to a maximum. While stirring vigorously, add the ammonia slowly. Stir until the casein is dissolved and set aside to hydrolize. After about two weeks, when the casein solution has thinned, due to hydrolosis, add ten parts of arsenious acid which has been worked to a paste in a small amount of water. Then take twenty (20) parts of alum in an equal amount of water (heated until alum is dissolved) and add slowly to the casein mixture while agitating. In order to thoroughly incorporate the aluminum hydrate (which will form as curds when the alum is added to the casein mixture), it is best to heat the compound to two hundred degrees Fahrenheit, stirring meanwhile until the aluminum hydrate is homogeneously mixed throughout the compound. Finally it will be well to pass the compound through a suitable colloiding machine, in order to insure the suspension of the gelatinous aluminum hydrate.

The efficiency of "cell solution B" may be somewhat increased by adding two parts of potassium hydrate, but this ingredient is not essential. The hydrate should be dissolved in an equal amount of water before adding to the "cell solution". The above are the two preferred "cell solutions", but we do not wish to be restricted to the use of these only, as we have found other solutions useful in our process of making cellular concrete. For cellular concrete which is designed to weigh sixty (60) to sixty-two (62) pounds per cubic foot a proper slurry may be made up as follows:

For each cubic foot of finished cellular concrete take:

| Portland cement | 30 pounds |
|---|---|
| Sand | 30 pounds |
| Water | 8½ pounds |
| "Cell solution", either "A" or "B" | 2.4 ounces |

In making the slurry any one of the different apparatus described in the foregoing should be set in motion to produce a peripheral speed of twenty-five (25) to thirty-six (36) feet per minute of the helical blades.

First the water and then the cement with the sand are introduced in the container 20. After the slurry has become homogeneously and smoothly mixed, the "cell solution" is added. The revolving cages will mix air bubbles into the slurry, and in the presence of the cell solution the air bubbles will appropriate protective envelopes from the cell solution, such that after a few minutes of operation of the machine, the contents will have increased in volume to the desired amount.

It is to be understood that the invention as here described may be varied considerably in regard to its details of execution and application within the scope of the claims.

What is claimed is:

1. In a concrete mixer, a substantially cylindrical container for cement slurry, means for creating currents in axial direction of the container, and other means for creating centripetal currents therein; said other means comprising a perforated bottom in the container, a chamber for compressed gas coextensive with said bottom, and suitable connection with said chamber from a source of compressed gas; a set of perforated cylinders of graded diameters mounted one within the other and interiorly of said first means, said cylinders being freely revoluble in the container.

2. In a concrete mixer, a substantially cylindrical container for cement slurry, means for creating currents in axial direction of the container comprising revolubly mounted helical blades, and other means for creating centripetal currents therein; said other means comprising a series of circumferentially arranged buckets interiorly of said helical blades and set at a small angle with regard to radial lines of the container.

3. In a concrete mixer, a substantially cylindrical container for cement slurry, means for creating currents in axial direction of the container comprising revolubly mounted helical blades, and other means for creating centripetal currents therein; said other means comprising a series of circumferentially arranged buckets interiorly of said helical blades and set at a small angle with regard to radial lines of the container; a set of perforated cylinders of graded diameters mounted one within the other and interiorly of said first means, said cylinders being freely revoluble in the container.

4. In a concrete mixer, a substantially cylindrical container for cement slurry, oppositely pitched spirals for creating counter currents in axial direction of the container, means for creating centripetal gaseous currents therein; and suitable connection with said means from a source of compressed fluid.

In witness whereof, we have hereunto set our hands at Berkeley, California, this 19th day of March, A. D. nineteen hundred and-twenty-eight.

JOHN A. RICE.
RICHARD B. RICE.